3,598,838
METHOD OF PURIFYING AMINO ACIDS

Koji Toi, Yokohama-shi, Naoko Nakayama, Naotake Sato, Takekazu Akashi, and Noboru Uchiyama, Tokyo, Japan, assignors to Ajinomoto Co., Inc., Tokyo, Japan
No Drawing. Filed Aug. 21, 1968, Ser. No. 754,450
Claims priority, application Japan, Aug. 28, 1967, 42/55,140; Mar. 27, 1968, 43/19,883
Int. Cl. C07d 27/04; C07c 61/00
U.S. Cl. 260—326.3
3 Claims

ABSTRACT OF THE DISCLOSURE

Proline, glycine, alanine, valine, phenylalanine, methionine, and lysine form adducts with chlorendic acid, which are insoluble or only sparingly soluble in water, and may thereby be separated from all other amino acids which do not form insoluble chlorendic acid salts under these conditions.

---

This invention relates to the purification of amino acids, and particularly to the recovery and purification of proline, glycine, alanine, valine, methionine, phenylalanine, and lysine.

While the afore-mentioned seven amino acids are finding increasingly wide fields of application as food supplements, in medicine, and in biological research, the methods known heretofore for recovering them in pure form were complex and costly. The ion-exchange techniques most commonly used for recovering them from mixtures with other amino acids and inorganic salts require precise control and are not practical for industrial use. Specific reagents available heretofore for precipitating the afore-mentioned seven amino acids from their aqueous solutions were costly and the yields of precipitated amino acids were often unsatisfactory.

We now have found that chlorendic acid or 1,4,5,6,7,7-hexachlorobicyclo[2,2,1]-5 - heptene - 2,3-dicarboxylic acid forms adducts with the afore-mentioned amino acids, which are insoluble or only sparingly soluble in aqueous media over the pH range from 2 to 10. The adducts are readily decomposed by means of strong acids at lower pH, and the components of the adduct may then be separately recovered. Chlorendic acid is a readily available raw material of the plastics industry.

Surprisingly, chlorendic acid does not form insoluble adducts in aqueous solution under the same conditions with any other amino acid which we have tested. More specifically, such adducts are not formed with acidic amino acids, such as aspartic acid or glutamic acid, nor with neutral amino acids, such as leucine, isoleucine, serine, threonine, or tryptophane. The afore-mentioned seven amino acids may thus be separated easily from their mixtures with other amino acids. When more than one of the afore-mentioned seven acids is present in an aqueous medium, a mixture of chlorendic acid adducts may be obtained. If one of the amino acids is present in larger amounts than others, im may be precipitated along by the use of an amount of the reagent equimolar with the prevalent amino acid.

The precipitation method of this invention is applicable to the optically active as well as the racemic forms of proline, glycine, alanine, valine, phenylalanine, methionine, and lysine. It has been used successfuly on crude amino acid mixtures obtained by hydrolysis of proteins, on fermentation broths containing the susceptible amino acids, and on synthesis mixtures containing the amino acids together with other organic and inorganic compounds, including inorganic salts and complex organic coloring matter and humins.

The concentration of the amino acid to be precipitated by chlorendic acid is not critical. It is usually most convenient to precipitate the amino acid from an aqueous solution in which its concentration is between 1 and 20 g./dl. Other solvents miscible with water may be present in the precipitation medium. The lower alkanols, such as methanol or ethanol, or the lower alkanones, such as acetone and methylethylketone, do not interfere with the precipitation if present as minor constituents of the mixture.

Highest yields are obtained with equimolar amounts or a slight excess of chlorendic acid in the precipitation of proline, glycine, alanine, valine, phenylalanine, or methionine which have each one amino group. Two moles of chlorendic acid are needed per mole of lysine to provide one mole equivalent of chlorendic acid for each amino group in the amino acid.

The water-soluble salts of chlorendic acid, such as the sodium, potassium, or ammonium salt, are as effective as the free acid since only the anions of chlorendic acid participate in the reaction. While the adducts are not more than sparingly soluble at pH 2–10, the solubility is usually lowest at pH 3 to 6, and 80–100% of the amino acids mentioned above which are present in the precipitation mixture can be recovered by the method of the invention. No precipitate or no useful amount of precipitate is formed at pH values below 1 and above 10. All conventional mineral acids and strong bases may be used for adjusting the pH to the required value.

The precipitation occurs at any temperature at which the employed aqueous system is liquid, and operation at room temperature is entirely practical. Most complete separation of the seven acids mentioned above from other amino acids is usually obtained if the reagents are combined at ambient temperature, and the resulting slurry is heated to 60° to 80° C. and permitted to cool before the solids are separated from the mother liquor by filtration, centrifuging, or decanting. Any traces of other amino acids adhering to the precipitate are readily removed by washing with cold water.

The adducts decompose in strongly acid aqueous media, such as solutions of hydrochloric or sulfuric acid having a pH not higher than 1. Chlorendic acid remains insoluble and is readily recovered for reuse. The amino acid is recovered from the acid solution by any convenient method.

The following examples are further illustrative of this invention, and it will be understood that the invention is not limited thereto.

EXAMPLE 1

40.5 g. chlorendic acid (20% excess) were added to 100 ml. of an aqueous solution of 10 g. L-proline. The mixture was stirred for 6 hours at room temperature and had a pH of 2.8. The resulting slurry was filtered, and 49.6 g. of crude adduct were recovered in crystalline form. When recrystallized from 50% ethanol, the crystals were white and needle-shaped. They were identified as the expected adduct from their elementary analysis:

Calculated (percent): C, 33.64; H, 2.81; N, 2.75; Cl, 42.02. Found (percent): C, 33.36; H, 2.61; N, 2.78; Cl, 42.20.

The filtrate obtained from the slurry contained only 0.38 g. proline, indicating that 96.2% of the amino acid had been precipitated by the chlorendic acid.

48.5 g. proline-chlorendic acid adduct were suspended in 1 N hydrochloric acid, and the suspension was stirred for one hour at room temperature, and then filtered. The filtrate was evaporated to dryness in a vacuum, the residue was dissolved in 55 ml. ethanol, and 7 ml. pyridine were added, causing crystallization of 8.2 g. L-proline when the mixture was stored in a refrigerator.

EXAMPLE 2

100 ml. of a solution containing 10.0 g. L-proline, 0.98 g. L-glutamic acid, 1.86 g. L-alanine, 1.27 g. L-valine, and 0.29 g. glycine in water were stirred with 40.5 g. chlorendic acid, equimolar with the L-proline present. After six hours stirring at room temperature, the pH of the mixture was 2.2.

The slurry obtained was filtered. The filtrate was found to contain 0.61 g. L-proline, 1.00 g. L-glutamic acid, 1.90 g. L-alanine, 1.21 g. L-valine, and 0.30 g. glycine. Allowing for analysis errors, 93.9% of the proline was precipitated while the other amino acids originally present remained in solution.

EXAMPLE 3

A fermentation broth was partly purified by ion exchange resin treatment. The aqueous liquid obtained contained, in 100 ml., 5.6 g. L-proline, 1.04 g. L-alanine, 0.72 g. L-valine, 0.55 g. L-glutamic acid, and 0.16 g. glycine. 22.7 g. chlorendic acid, equimolar with the proline present, were added, and the mixture was stirred at room temperature for six hours whereupon its pH was 2.6

The precipitate formed was filtered off and washed with 10 ml. cold water. It was then suspended in 100 ml. 1 N hydrochloric acid, and the suspension was stirred at room temperature for one hour. It was filtered to remove chlorendic acid, and the filtrate was evaporated to dryness in a vacuum. The residue was taken up in 30 ml. ethanol, a small amount of insoluble matter was removed by filtration, and 3.5 ml. of a mixture of pyridine and ethyl ether were added to the filtrate. L-proline crystallized at low temperature, and 4.5 g. pure crystals were recovered. They gave a single spot on a paper chromatogram.

EXAMPLE 4

DL-alanine was prepared from acetaldehyde by Strecker's reaction, and the crude reaction mixture was adjusted to approximately pH 7 by the addition of sulfuric acid. The solution so obtained contained 9.6 g./dl. DL-alanine, 14.2 g./dl. sodium sulfate, and 1.3 g./dl. sodium formate.

40.0 g. chlorendic acid were added to 100 ml. of the above solution, and the mixture so obtained was stirred at room temperature for 6 hours. Its pH was 2.8. The crystalline precipitate formed was filtered off and washed with 15 ml. cold water. The white crystals of alanine-chlorendic acid adduct so obtained were suspended in 200 ml. 1 N hydrochloric acid, and the suspension was stirred for one hour at room temperature to dissolve the amino acid, leaving the chlorendic acid as a solid precipitate which was removed by filtration. The filtrate was evaporated to dryness, and the residue was dissolved in 15 ml. water. When 4.5 ml. pyridine and 30 ml. methanol were added to the solution, and the mixture was stored in a refrigerator, DL-alanine crystallized, and the crystals were filtered off, washed with methanol and dried. They weighed 6.3 g. and were 100% pure.

EXAMPLE 5

100 ml. of an aqueous solution of 5.0 g. L-valine, 1.1 g. L-leucine, and 0.7 g. L-alanine were mixed with 16.5 g. chlorendic acid, an amount equimolecular to the L-valine present. The mixture was stirred for six hours at room temperature, and its pH was 2.6.

White crystals of L-valine-chlorendic acid adduct were then filtered off, washed with 5 ml. cold water, and decomposed in 100 ml. 1 N hydrochloric acid as described above.

The acid valine solution so obtained was separated from the insoluble chlorendic acid and evaporated to dryness. The residue was dissolved in 8 ml. hot water and 3.7 g. pure L-valine were crystallized in a refrigerator after addition of 2.5 ml. each of pyridine and methanol.

EXAMPLE 6

Formaldehyde was subjected to Strecker's reaction to produce glycine, and the crude reaction mixture was adjusted to pH 7 with sulfuric acid. It contained 9.2 g./dl. glycine and 14.0 g./dl. sodium sulfate, and one deciliter thereof was stirred with 45.5 g. chlorendic acid at room temperature for six hours whereby the pH of the mixture became 2.9.

6.1 g. pure crystalline glycine were obtained when the precipitated adduct was worked up by acid decomposition as described in the preceding examples.

EXAMPLE 7

100 ml. of an aqueous solution of 4.0 g. L-methionine were mixed with 12.5 g. chlorendic acid (20% excess) for six hours at room temperature, and 13.8 g. adduct were precipitated. 0.048 g. L-methionine were found by analysis in the supernatant liquid indicating that the adduct contained 98.8% of the amino acid originally present.

13.8 g. adduct, when decomposed with 100 ml. 1 N hydrochloric acid yielded a methionine solution from which 3.5 g. pure crystals were recovered by evaporation, dissolution of the dry residue in 30 ml. water, removal of a small amount of insoluble matter, and crystallization at low temperature induced by the addition of 5 ml. pyridine and 20 ml. methanol.

EXAMPLE 8

100 ml. of an aqueous solution containing 4.0 g. L-methionine were mixed with 25 ml. of a solution containing 10.5 g. chlorendic acid (equimolar to the methionine). The mixture was stirred as above, and the adduct crystals formed were recovered by filtration, washed with 80% aqueous methanol, and dried. The amount of methionine in the filtrate indicated that the precipitate contained 81% of the methionine originally present.

Teh adduct crystals melted at 173° to 175° C. and were identified by their nitrogen content:

Calculated for $C_{14}H_{15}O_6NSCl_6$ (percent): N, 2.60. Found (percent): N, 2.57.

EXAMPLE 9

2.0 g. L-phenylalanine, 1.9 g. L-leucine, and 1.5 g. L-isoleucine were dissolved in enough water to make 100 ml., and the solution was stirred for six hours at ambient temperature with 5.7 g. chlorendic acid (20% excess over the phenylalanine). 6.1 g. adduct were recovered by filtration. The filtrate contained 0.13 g. L-phenylalanine, 1.91 g. L-leucine, and 1.49 g. L-isoleucine, indicating the precipitation of 93.4% of the original phenylalanine without measurable amounts of leucine or isoleucine. 1.6 g. L-phenylalanine were recovered as pure crystals from the adduct in the manner described above.

EXAMPLE 10

A solution of 2.0 g. L-phenylalanine was mixed with 20 ml. methanol solution of an equimolecular amount (4.7 g.) of chlorendic acid. The mixture was stirred at ambient temperature for six hours to precipitate the adduct which was filtered, washed with a small amount of cold water, and dried. The filtrate contained 21% of the original phenylalanine. The crystals obtained melted gradually at 121° to 127° C. and were identified by their nitrogen content:

Calculated for $C_{18}H_{15}O_6NCl_6$ (percent): N, 2.53. Found (percent): N, 2.49.

EXAMPLE 11

From 100 ml. of an aqueous solution of 7.0 g. L-lysine, 0.4 g. arginine, and 0.1 g. L-leucine, 412 g. dry adduct were precipitated by stirring with 41.0 g. chlorendic acid (2.2 mole per mole lysine), and the mother liquor was found to contain 0.23 g. L-lysine, 0.4 g. L-arginine, and 0.1 g. L-leucine. 96.7% lysine had been selectively precipitated.

The adduct crystals were decomposed with 200 ml. 1 N hydrochloric acid, chlorendic acid was filtered off, and the filtrate was evaporated to dryness in a vacuum. A solution of the residue in 20 ml. water was adjusted to pH 5.7 with 1 N sodium hydroxide solution, and crystallization was induced by adding 15 ml. methanol. 7.9 g. L-lysine hydrochloride crystals were recovered (82% yield).

EXAMPLE 12

3.2 g. L-lysine were dissolved in enough water to make 20 ml., and 30 ml. of a solution of 17.0 g. chlorendic acid (two mole equivalents) in methanol were added. After six hours stirring at room temperature and overnight storage in a refrigerator, a crystalline adduct was filtered off, dried and recrystallized from a 1:5 mixture of water and propanol. The purified crystals melted at 177°–179° C. and were soluble in methanol, but only sparingly soluble in water. They consisted of L-lysine and chlorendic acid in a mole ratio of 1:2 as indicated by their nitrogen content:

Calculated for $C_{24}H_{22}O_{10}N_2Cl_{12}$ (percent): N, 3.03. Found (percent): N, 2.95.

EXAMPLE 13

40 ml. of an aqueous solution containing 6.4 g. L-lysine were mixed with 8.5 g. chlorendic acid (0.5 mole chlorendic acid per mole lysine) in methanol solution, and the mixture was stirred for three hours at room temperature. No precipitate formed. The mixture was then evaporated in a vacuum to remove the methanol and water present, and 50 ml. methanol were added to the residue, whereby crystallization was induced.

The crystals were filtered off, dried, and recrystallized from 75% aqueous isopropanol. The purified crystals decomposed at 155° C., were insoluble in methanol, but soluble in water. The nitrogen content agreed with the calculated value for a mixture of 2 moles lysine and one mole chlorendic acid.

What is claimed is:

1. An adduct of chlorendic acid with an amino acid selected from the group consisting of proline, glycine, alanine, valine, phenylalanine, methionine, and lysine, said adduct being a solid sparingly soluble in water and containing one mole equivalent of said chlorendic acid for each amino group in said amino acid.

2. A method of purifying an amino acid selected from the group consisting of proline, glycine, alanine, valine, phenylalanine, methionine, and lysine, which comprises reacting said amino acid in aqueous solution at pH 2 to 10 with chlorendic acid or a water soluble salt of chlorendic acid until the adduct of chlorendic acid and of said amino acid is precipitated from said solution, separating the precipitated adduct from said solution, and decomposing said adduct.

3. A method as set forth in claim 2, wherein said aqueous solution has a pH value of 2 to 10, and said adduct is decomposed by contacting the same with an aqueous medium having a pH not substantially higher than 1.

References Cited

UNITED STATES PATENTS 3,088,911   5/1963   Staffin et al. _____ 260—501.16X
3,294,816   12/1966  Latos et al. _____ 260—501.16X ALEX MAZEL, Primary Examiner J. A. NARCAVAGE, Assistant Examiner U.S. Cl. X.R.

260—501.16